Oct. 20, 1959  V. F. HAMBOR ET AL  2,909,713
HIGH TEMPERATURE SOLENOID
Filed Nov. 18, 1957
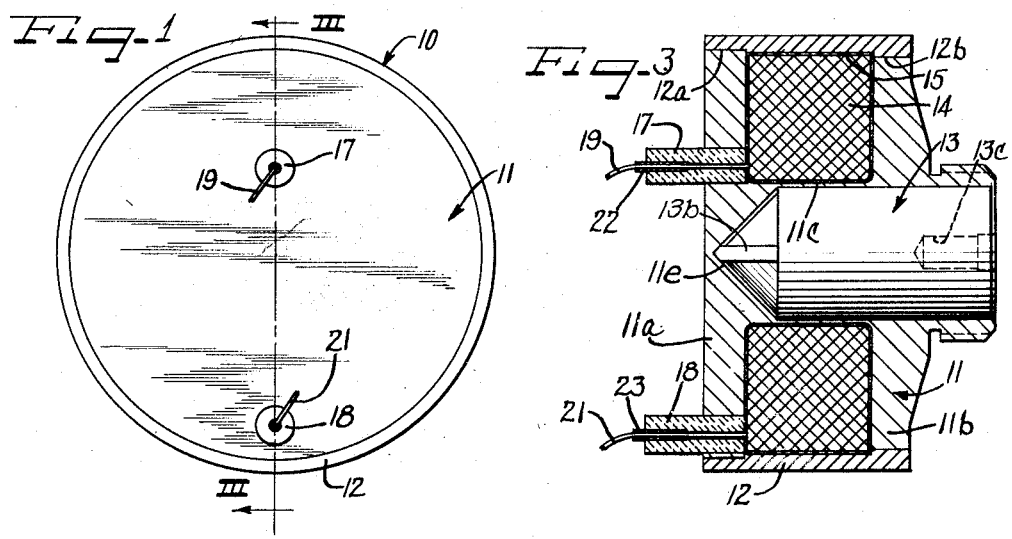
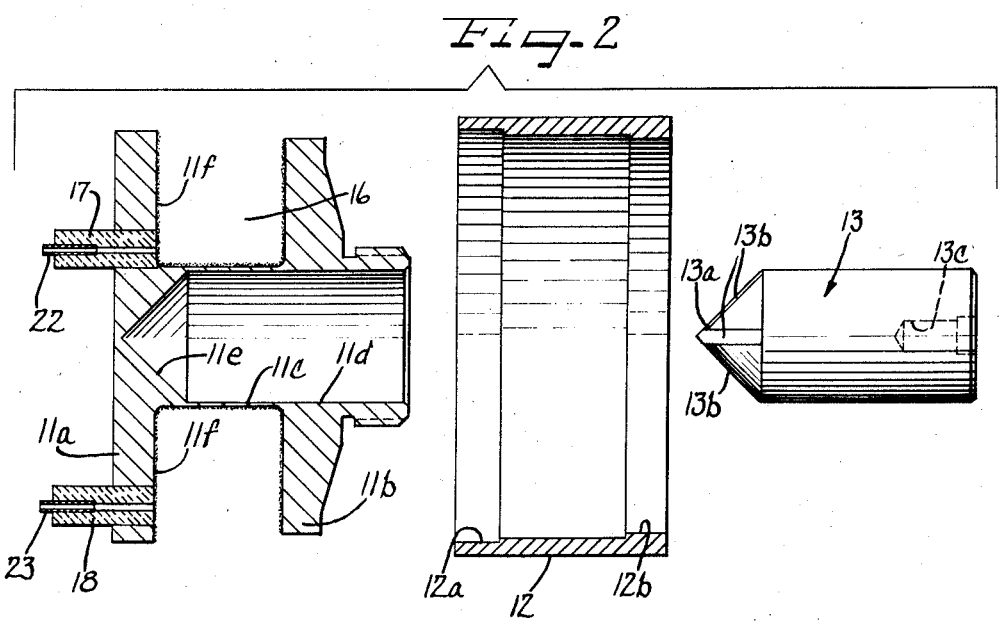
Inventors
Valentine F. Hambor
Robert J. Shafranek
Jerome H. Silverman 2,909,713
Patented Oct. 20, 1959

2,909,713

HIGH TEMPERATURE SOLENOID

Valentine F. Hambor, Fairport Harbor, Robert J. Shafranek, Kent, and Jerome H. Silverman, Euclid, Ohio, assignors to Thompson Ramo Wooldridge Inc., a corporation of Ohio Application November 18, 1957, Serial No. 697,047

3 Claims. (Cl. 317—165)

The present invention is directed to an improved solenoid structure particularly useful at high temperatures on the order of 1000° F.

Electrical control systems for high temperature work such, for example, as in jet aircraft frequently require the use of solenoids which must be reliable and positive in operation under widely varying temperature conditions. Due to the manner in which ordinary solenoids are constructed, such solenoids frequently do not meet the requirements imposed by high temperature conditions because of the tendency of the insulation to deteriorate, and other factors.

Accordingly, an object of the present invention is to provide an improved solenoid assembly which is capable of reliable operation over extreme ranges of temperature.

A further object of the present invention is to provide a mechanically durable, air impervious solenoid structure.

Still another object of the invention is to provide an improved solenoid assembly for high temperature work which is readily constructed from commercially available materials.

Other objects and features of the present invention will be apparent to those skilled in the art from the following description of the attached sheet of drawings which illustrates a preferred embodiment of the invention.

In the drawings:

Figure 1 is a front elevational view of the solenoid structure of the present invention;

Figure 2 is an exploded view, in cross section, of some of the components of the solenoid assembly; and Figure 3 is a cross-sectional view taken substantially along the lines III—III of Figure 1 with the elements in their assembled relation.

As shown in the drawings:

Reference numeral 10 indicates generally a solenoid assembly manufactured according to hte present invention including a body member 11, a sleeve 12, a core 13 and a solenoid coil 14.

The body member 11 is formed with axially spaced annular flange portions 11a and 11b, separated by a relatively thin walled hub portion 11c. The body member 11 is provided with a blind ended axial bore 11d which terminates in a conically shaped seating face 11e at its forward end for receiving the core 13 in seated relation.

As best seen in the exploded view of Figure 2, the cylindrical sleeve 12 is arranged to be received over the peripheral edges of the flange portions 11a and 11b, the sleeve 12 having a circumferentially extending groove 12a and a circumferentially extending rib 12b at opposed ends thereof arranged to be received in tight shrink fitted engagement with the peripheral surfaces of the flange portions 11a and 11b. The combination of the body member 11 and the sleeve 12 thereby provide an air-tight coil receiving space 16 in which the coil 14 is disposed about the hub 11c.

Prior to winding the coil 14 about the hub 11c, the inner radial faces of the flanged portions 11a and 11b as well as the hub 11c are provided with a ceramic coating 11f. This coating may be applied by spraying the metal surfaces with aluminum oxide or other suitable ceramic material in powdered form.

The contact terminals for the ends of the wire constituting the coil 14 are provided by a pair of ceramic insulators 17 and 18 which are secured to bored holes in the face of the flange 11a by means of porcelain enamel bonding. The two ends of the coil 14, illustrated at 19 and 21 are led through a pair of metallic tubes 22 and 23 respectively and sealed to the tubes with a 1500° F. solder, the tubes being imbedded at their inner end in the ceramic insulators 17 and 18.

The body member 11 and the sleeve 12 are composed of a metal which is capable of withstanding reasonably high temperatures while retaining its mechanical, magnetic and oxidation resistance characteristics. We prefer to employ material such as number 416 stainless steel although other alloy compositions having good mechanical strength, magnetic properties, and resistance to creep and oxidation at elevated temperatures may also be employed.

The coil 14 preferably consists of fine silver wire with each turn being insulated from adjacent turns by means of a glass fiber insulation or other insulation capable of withstanding temperatures on the order of 1200° F. After the coil 14 is wound around the hub 11c, the coil form is coated with a high temperature resisting cement 15. The vehicle of the cement is composed of various silica resins and the filler is a combination of inert materials including mica.

The high temperature cement is applied to the coil form in conjunction with a suitable vehicle and dried on the form overnight. The coating is then cured at a temperature of 250° F. under vacuum conditions for a period of about 2 hours. Following the curing, the material is baked in a furnace beginning at a temperature of about 300° F., and increasing the temperature in 50° F. encrements every 15 minutes until a temperature of 1150° is reached. The final cure takes place at a temperature of about 1150° F. for a period of about 45 minutes.

After the coil 14 has been suitably insulated by the high temperature cement, the sleeve 12 is shrink-fitted onto the flange portions 11a and 11b to complete the assembly of the housing for the solenoid.

The core 13 has a conical nose portion 13a arranged to be received in seated relation against the seating face 11e. To facilitate release of the core upon de-energization of the solenoid, a fixed air gap is introduced into the magnetic circuit by welding non-magnetic stainless steel sections 13b onto the conical nose 13a. The core 13 is also provided with an axial bore 13c for receiving an actuating arm or the like.

It will be evident that various modifications can be made to the described embodiment without departing from the scope of the present invention.

We claim as our invention:

1. A high temperature solenoid comprising a body member having axially spaced flange portions and a relatively thin walled axially bored hub portion extending between said flange portions, a cylindrical sleeve in tight engagement with the peripheral surfaces of said flange portions to provide an air-tight annular space extending radially outwardly from said hub portion, the walls of said body member defining said annular space having a refractory coating thereon, and a core freely slidable within the axial bore of said hub portion.

2. A high temperature solenoid comprising a body member having axially spaced flange portions and a relatively thin walled, axially bored hub portion extending between said flanged portion, a cylindrical sleeve in tight engagement with the peripheral surfaces of said flanged portions to provide an air-tight annular space extending radially outwardly from said hub portion, the walls of said body member defining said annular space having a ceramic coating thereon, a solenoid coil disposed in said space about said hub portion, said coil having a coating of a high temperature cement thereon and a core freely slidable within the axial bore of said hub portion.

3. A high temperature solenoid comprising a body member having axially spaced flange portions and a relatively thin walled, axially bored hub portion extending between said flange portions, a cylindrical sleeve in tight engagement with the peripheral surfaces of said flange portions to provide an air-tight annular space extending radially outwardly from said hub portion, the walls of said body member defining said space having a refractory inorganic coating thereon, a solenoid coil disposed in said space about said hub portion, a baked insulating film covering the outer surface of said coil, and a core freely slidable within the axial bore of said hub portion.

References Cited in the file of this patent

UNITED STATES PATENTS

| | | |
|---|---|---|
| 2,388,448 | Sundt et al. | Nov. 6, 1945 |
| 2,553,362 | Dannenberg | May 15, 1951 |